Patented May 10, 1932

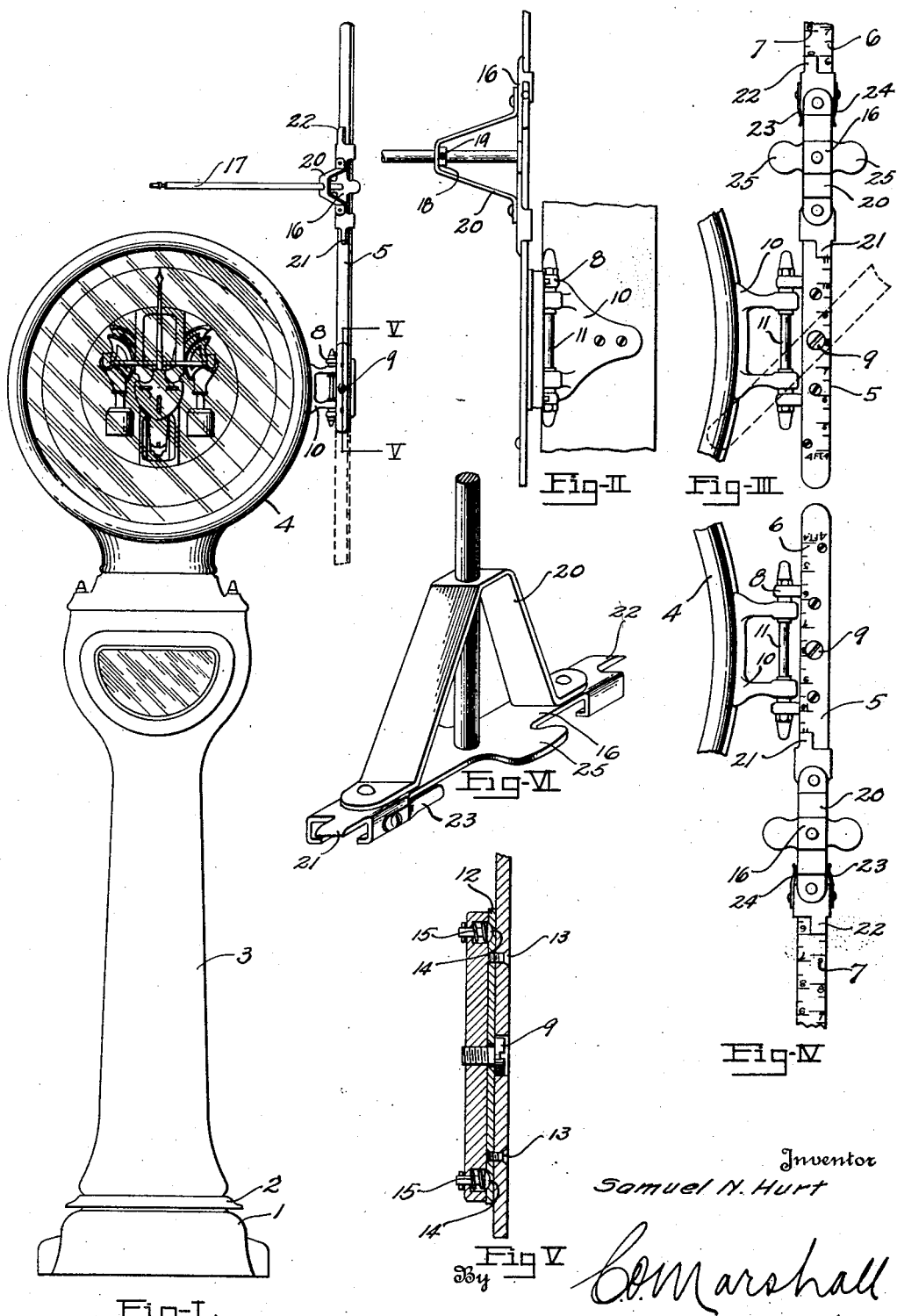

1,857,280

UNITED STATES PATENT OFFICE

SAMUEL N. HURT, OF TOLEDO, OHIO, ASSIGNOR TO TOLEDO SCALE MANUFACTURING COMPANY, OF TOLEDO, OHIO, A CORPORATION OF NEW JERSEY

HEIGHT MEASURING DEVICE

Application filed November 21, 1928. Serial No. 320,927.

This invention relates to measuring instruments and particularly to devices for measuring and determining the height of persons.

One of the principal objects of this invention is the provision of a simple and accurate height measuring device.

Another object is the provision of a measuring device of compact construction, yet having a range capable of measuring small children and tall men.

A further object is the provision of a measuring devices which may be used in combination with person-weighing scales of all types.

Still another object of this invention is the provision of a measuring device, which may be attached to the walls of gymnasiums, schools or similar buildings.

A still further object is the provision of a measuring device which may be easily and inexpensively made, without the aid of special machinery.

A still further object is the provision of means permitting the device to be disassembled and packed in a small parcel for shipment.

Other objects and advantages will be apparent from the following description, in which reference is had to the accompanying drawings illustrating preferred embodiments of the invention and wherein similar reference numerals designate similar parts through the several views.

In the drawings:—

Figure I is an illustration of my invention attached to person weighing scale.

Figure II is a fragmentary side view of my device, showing how it is attached to a scale.

Figure III is a fragmentary front elevation of my invention, in position to measure human beings more than four feet in height.

Figure IV is a fragmentary front elevation of my invention, in position to measure human beings less than four feet in height.

Figure V is an enlarged sectional fragmentary view of my invention, substantially on line V—V of Figure I.

Figure VI is an enlarged perspective view of the indicating slide.

Referring to the drawings in detail, I have shown the measuring device as mounted on a scale of the person weighing type. The base 1 contains lever mechanism (not shown) on which the platform 2 is mounted. Secured to the rear of the base 1 is an upwardly extending column 3 which supports a substantially watch case shaped housing 4, to which the measuring device of my invention is secured.

The measuring device comprises a metallic bar 5 on which are engraved or printed two rows of height indicia 6 and 7. It is fulcrumed adjacent to one of its ends by a screw 9 to a member 8 which with the bracket 10 and the pin 11 forms a hinge, on which the device may be revolved. Fastened to the rear of the metallic bar 5 is a plate 12. This is retained by two screws 13 and is provided with two depressions into which two plungers 14 are forced by the pressure of the springs 15.

Mounted on the bar 5 is the sliding indicator 16. This is provided with the gage rod 17. A hole in the sliding indicator is adapted to receive the end of the rod 17. A collar 18 encircles the rod and is locked, thereto, by a set screw 19. The bracket 20, which is secured to the slide 16 and which is adapted to receive the rod 17, serves to retain and brace it. The slide 16 is provided with two indicators 21 and 22. The indicator 21 is adapted to co-operate with the row of height indicia 6 and the indicator 22 is adapted to co-operate with the row of indicia 7. Two tension springs 23 and 24 are secured to the indicator slide 16. These grip the sides of the bar 5 and are adapted to retain the indicators in any position, yet allow a free sliding movement. To facilitate the manipulation of the indicators, two ears 25 are formed on the sides of the slide 16.

In the operation of the device, the person desiring to ascertain his height, after stepping on the platform 2, revolves the device on the hinge pin 11 until the gage rod 17 is immediately above his head. Then by grasping the ears 25 of the slide 16, he draws the slide downward until the gage rod rests on the top of his head; the indicator co-operating with the proper row of vertically extending height indicia, then indicates the correct height of the person.

When a child or a small person is to be measured, the upwardly extending metallic bar 5 is turned about its fulcrum screw 9 through an angle of 180°, assuming successively the positions shown by the dotted lines in Figures III and I. The spring pressed plungers 14 which were forced out of engagement with the depressions in the plate 12, again engage these and assure vertical alignment of the device. The measuring operation is performed in the same manner as in the previously cited example, with the exception that height is indicated by the index 22 and the indicia row 7.

It will readily be seen that the device can be made by the usual machinery found in machine shops.

For shipping purposes, the set screw 19 in the collar 18 is loosened and the gauge rod withdrawn and the pin 11 in the bracket 10 is removed. The device now takes up very little space and may easily be packed into the case or crate containing the scale.

While it will be apparent that the illustrated embodiment of my invention herein described is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a device of the class described, in combination, a weighing scale, a bar secured thereto, said bar having a plurality of indicia columns extending in opposite directions, a sliding member mounted on said bar and having a laterally extending rod adapted to gage heights and means to hold it stationary at any point on said bar and said sliding member having a plurality of indexes adapted to cooperate with said plurality of indicia columns.

2. In a device of the class described, in combination, a weighing scale, a bar secured thereto, said bar being pivoted adjacent to one of its ends for turning it from the upwardly extending position to a depending position and having spring pressed means for holding said bar in either position, said bar bearing a set of height measuring indicia adapted for use when said bar is in upwardly extending position and a set of height measuring indicia adapted for use when said bar is in depending position.

3. In a device of the class described, in combination, a weighing scale, a bar secured thereto, said bar being pivoted adjacent to one of its ends for turning it from an upwardly extendng position to a depending position and having spring pressed means for holding said bar in either position, said bar having a plurality of indicia columns and a member slidably mounted thereon having a plurality of indexes, each of said indexes being adapted to co-operate with one of the indicia columns to indicate heights, one of said columns of indicia with its co-operating index being adapted for use when said bar is in upwardly extending position, the other of said columns of indicia and its co-operating index being adapted for use when said bar is in depending position.

4. In a device of the class described, in combination, a weighing scale, a bar secured thereto, pivotal means whereby said bar may be rotated from an upwardly extending to a depending position, said bar having a plurality of indicia columns extending in opposite directions, one of said indicia columns being adapted to supplement the other to provide an unbroken sequence of heights, and gaging and indexing means slidably secured to said bar to co-operate with said indicia.

5. In a device of the class described, in combination, a weighing scale, height gaging and index means secured thereto, said means being pivoted adjacent one of its ends for rotation from upwardly extending to a depending position and hinge means whereby said indicating means may be rotated around a vertical axis said height gaging means being provided with a column of indicia adapted for use when said means is in upwardly extending position and a column of indicia adapted for use when said means is in depending position, said columns of indicia supplementing each other to form an extended series.

SAMUEL N. HURT.